Aug. 11, 1959  J. J. SCHROTH  2,899,060
VIBRATING SCREEN
Filed Aug. 8, 1958  2 Sheets-Sheet 1

United States Patent Office 2,899,060
Patented Aug. 11, 1959

2,899,060

VIBRATING SCREEN

John J. Schroth, Doylestown, Pa., assignor to Link-Belt Company, a corporation of Illinois Application August 8, 1958, Serial No. 753,937

8 Claims. (Cl. 209—403)

This invention relates to new and useful improvements in substantially enclosed vibrating screen assemblies, and deals more particularly with the means employed for supporting and tensioning the screen cloths used in such assemblies.

In some applications of vibrating screens it is important that the screen box be of a substantially enclosed construction so that the screening operation carried on within the box is isolated from the surrounding atmosphere. This is true, for example, in many applications in the food industry where for sanitary reasons the product screened must be protected against contamination from external sources. It is also true in cases where the material being handled is dusty and subject to polluting the work area if screened in an open deck assembly.

To meet this demand, various enclosed screen structures have been made in accordance with prior art teachings. One common failing, however, is that various parts of these structures have been difficult and time consuming to clean and maintain because of their relative inaccessibility. In most cases, for example, the screen cloth is rigidly clamped to the screen box, which necessitates not only the removal of the cover or the like, but also requires dismantling several cloth clamping elements from the sides of the box and removing the cloth before the cloth and the parts lying underneath the cloth can be thoroughly cleaned. In the food industry where health standards compel frequent cleanings, and to a differing extent in other industries, the excessive time consumed by such cleanings presents an expensive problem.

It is therefore a primary object of this invention to provide an improvement in vibrating screen assemblies whereby the various parts thereof are more readily accessible for cleaning, maintenance or replacement purposes.

A more specific object of this invention is to provide an improvement in enclosed vibrating screen structures whereby a cover member and the screen cloth are so related that both elements may be simultaneously mounted on or removed from the screen box.

Another object of this invention is to provide improved means for supporting and tensioning a screen cloth within a screen box, such means requiring few parts and being readily operated to effect removal of the cloth for replacement, cleaning or other purposes.

Other objects and advantages of this invention will become apparent during the course of the following description, and from the accompanying drawings forming a part thereof in which like numerals represent like parts throughout the same, and in which.

Figure 2:
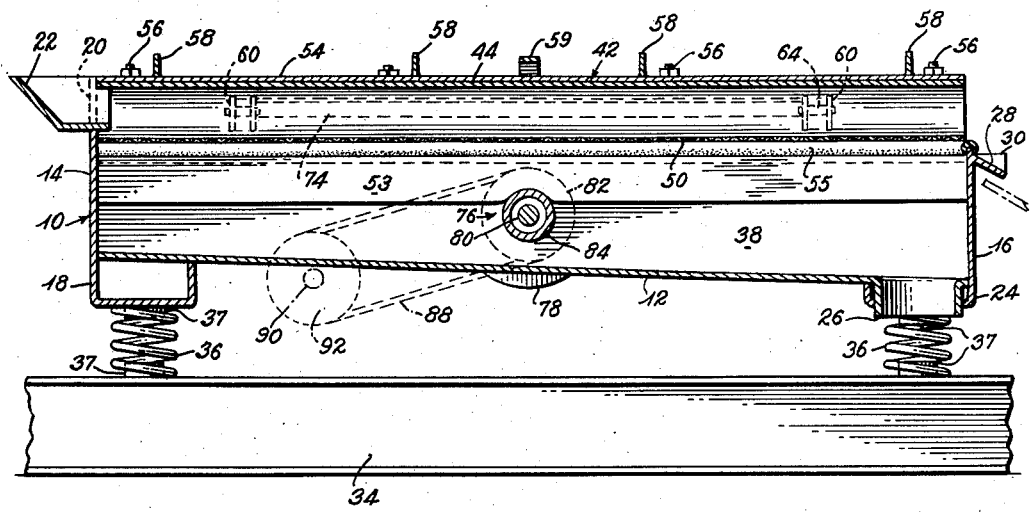
Figure 2 is a vertical sectional view of the screen assembly taken on line 2—2 of Fig. 1.

Turning now to the drawings, wherein is illustrated a preferred embodiment of the present invention, the form of vibrating screen assembly disclosed includes a screen box 10 having a substantially flat bottom 12 which slopes downwardly toward the discharge end of the box, as viewed in Fig. 2.

The opposite ends of the box 10 are substantially closed by a feed end plate 14 and a discharge end plate 16. Each of the plates 14 and 16 is secured by suitable means, such as by welding, to the respective ends of the box 10. As best seen in Fig. 2, the lower portion of the feed end plate 14 is bent inwardly and upwardly to define a transversely extending channel 18 which reinforces this end of the box 10. A materials receiving cut-out 20 is formed in the upper portion of the plate 14 through which material is fed into the interior of the screen assembly by means of a receiving spout 22 of any suitable construction which may be mounted upon the plate 14, as by welding.

The discharge end plate 16 is likewise formed with an inwardly and upwardly bent portion which defines a reinforcing channel 24 for this end of the box 10. As best seen in Fig. 2, the channel 24 is interrupted in its center to provide an opening from the edge of which a spout 26 depends to provide a discharge from the interior of the box 10. A transverse discharge lip 28 extends across the upper edge of the plate 16 and has a pair of spaced deflector elements 30 located to confine material flowing from the screen surface.

The screen box 10 is resiliently supported upon a pair of fixed frame elements 32 and 34 by coil springs 36 which are mounted at each end of the respective channels 18 and 24. The springs 36 may be maintained in position by piloting lugs 37 secured to the associated frame members 18—24 and channels 32—34.

As contemplated by the invention, the screen assembly includes a pair of laterally spaced side walls which extend longitudinally the entire length of the upper portion of the screen box, and a cover which substantially encloses the space between the tops of the side walls. The cover additionally serves to support a screen cloth within the screen box and cooperates with the side walls in such a way as to apply tensioning forces to the cloth.

Figure 3:
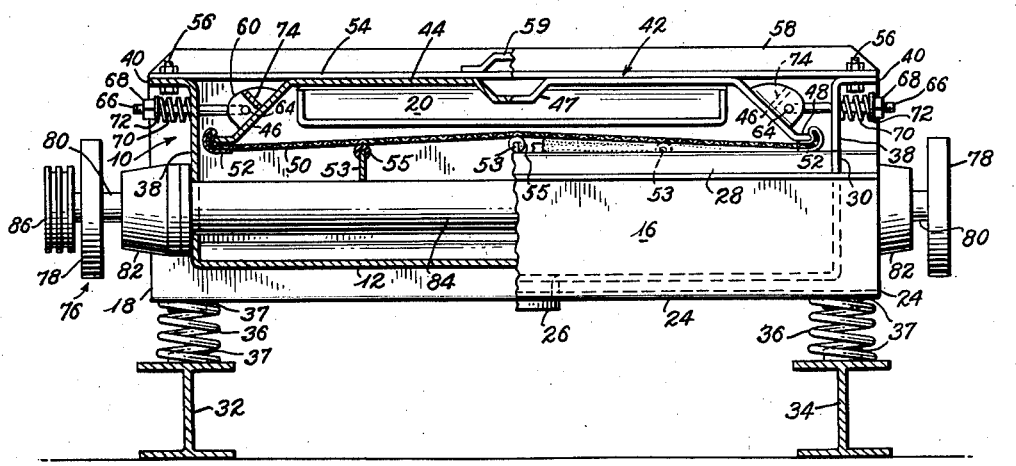
Figure 3 is a vertical sectional view of the screen assembly taken on line 3—3 of Fig. 1.

As best seen in Fig. 3, a pair of side walls 38 are connected along their bottom edges to the side edges of the bottom 12. The upper portion of each side wall 38 is bent laterally outwardly to form supporting flanges 40 which extend the entire length of the screen box 10.

Between the opposed side walls 38 is a screen cloth supporting and covering member 42 which extends both longitudinally from the feed end of the box to the discharge end and transversely between the side walls 38 so as to enclose substantially all of the above defined space. The member 42, as best seen in Fig. 3, includes a central portion 44 which extends the length of the screen box 10, and which has a longitudinally extending stiffening rib 47 formed in and about its middle portion by a series of bends. The member 42 further includes a depending skirt 46, inclined laterally outwardly, along each lateral edge of the central portion 44. The free edges of the skirts 46 are bent upwardly and outwardly to define flanges 48 which also extend along the entire length of the screen box 10. The overall lateral dimension of the screen cloth supporting and covering member 42 is such that the distance between the opposed flanges 48 is less than the distance between the side walls 38 so that each of the flanges 48 may be positioned in laterally spaced relationship with a corresponding side wall.

The flanges 48 engage and support the longitudinal edges of a screen cloth 50 which extends transversely of the screen assembly between the two flanges 48 and longitudinally the entire length of the screen box 10. These edges of the screen cloth 50 are connected to the flanges 48 by suitable means such as the hook connection illustrated in Fig. 3. This connection comprises a sheathing strip 52 folded to surround the longitudinal edge of the screen cloth and overlie both the upper and lower surfaces thereof for some distance inwardly of the side edge of the latter. The sheathing strip may be secured to the screen by bending of the sheathing and the screen under mechanical pressure and additionally by spot welding. The sheathing and the edge of the screen are bent to form a laterally inwardly opening hook which engages the bottom surface and edge of the flange 48 in a conventional manner.

An additional support for the center portion of the screen cloth 50 may be provided by longitudinally extending slats 53 which are spaced transversely of the screen box 10 and welded at either end to the feed end plate 14 and the discharge end plate 16. The upper edges of the slats 53 are covered by tubular cushioning strips 55 of resilient material which engage the bottom surface of the screen cloth 50.

Figure 1:
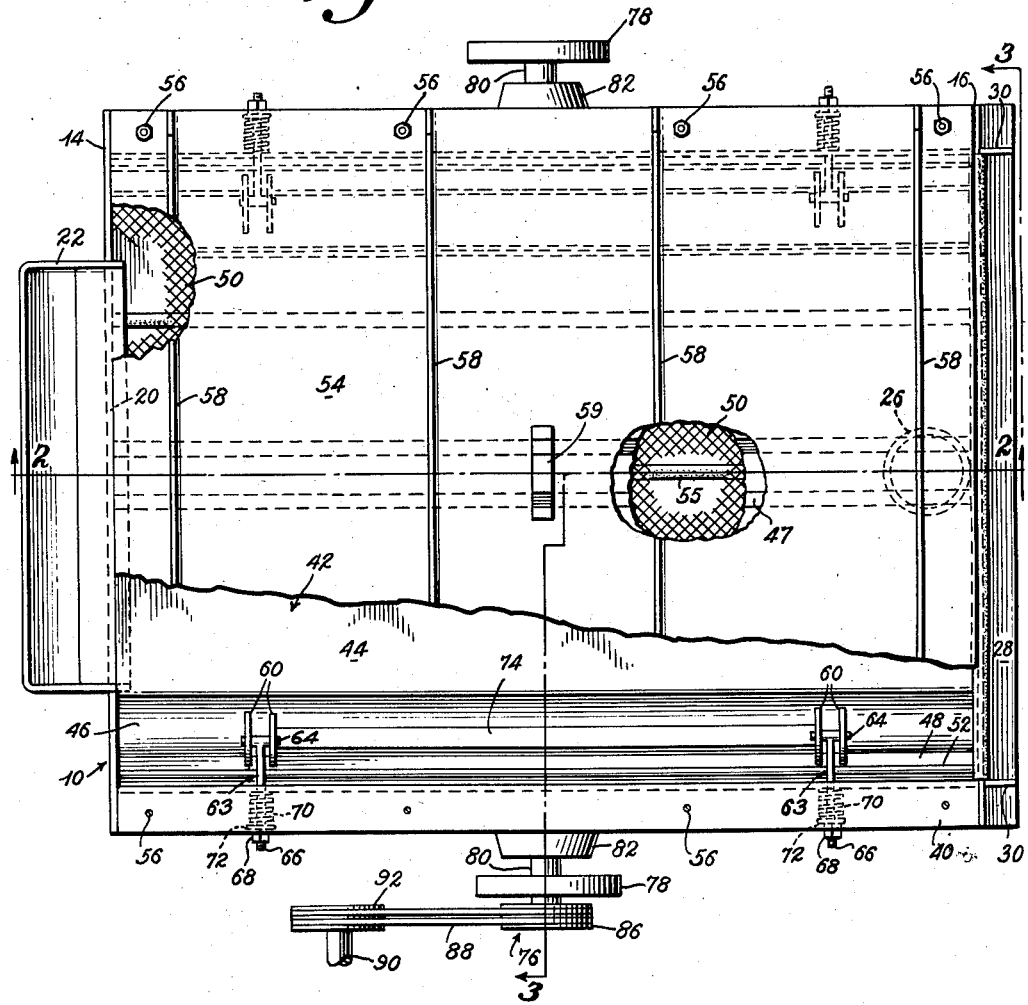
Figure 1 is a top plan view of a vibrating screen assembly embodying the present invention with certain parts being broken away to more clearly illustrate detail features of construction.

Means are also provided for vertically supporting the screen cloth supporting and covering member 42, as above described, in proper position between the side walls 38 with the flanges 48 thereof in laterally spaced relationship with the corresponding side walls 38. As best seen in Figs. 1 and 3, these means may comprise an outer cover 54 of flat sheet material extending laterally between the side wall flanges 40 and longitudinally from the feed end to the discharge end of the screen assembly. The longitudinal edges of the outer cover 54 bear against the upper surfaces of the side wall flanges 40 and are secured thereto by a plurality of bolts 56 or other suitable fastening means. The outer cover 54 also has a plurality of transversely extending stiffening ribs 58 and a handle 59 welded to the upper surface thereof. The screen supporting and covering member 42 is secured to the bottom surface of the outer cover 54 by welding or other conventional fastening methods. It will be observed that this particular form of support for the screen cloth supporting and covering member 42 results in a more complete isolation of the screen cloth from the surroundings since the outer cover 54 closes the space between the skirt flanges 48 and the side walls.

Referring to Figs. 1 and 3, it will be noted that a plurality of laterally outwardly protruding lug means are secured to each of the skirts along the length thereof. Each of these lug means includes two relatively closely spaced ears 60 welded to the skirt portion with each ear 60 having an opening 62 formed therein along a common longitudinal axis. A tie member 63 having a pin portion 64 extending through the two openings 62, and an arm 66 extending normally from the pin portion 64 between the two ears 60, is connected to each of the lug means. The arm 66 is capable of pivotal movement in a vertical plane about the axis of the pin portion 64.

The arm 66 of each tie member 63 passes through an opening in the corresponding side wall 38 and has a nut 68 threaded onto the free end thereof for axial advancement along its length. A helical compression spring 70 is placed over the arm 66 between the side wall 38 and the nut 68, together with a washer 72 between the spring 70 and the nut 68, so that axial advancement of the nut 68 toward the side wall 38 will compress the spring and create a tension force in the tie member 63 which tends to pull the associated skirt 46 and flange 48 toward the side wall 38. The two skirt flanges 48 are thereby urged in laterally opposite directions, pulling the screen cloth 50 between them and stretching it over the slats 53 and cushioning members 55.

Figure 4:
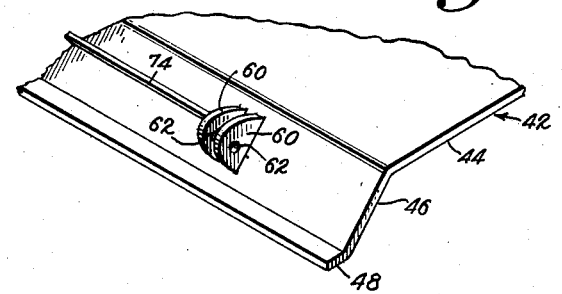
Figure 4 is a fragmentary view showing certain structural details of the screen cloth support and cover member employed in the screen assembly of Fig. 1.

In order that the tension force produced by the tie members 63 and their associated parts may be distributed uniformly along the length of the skirts 46, each skirt is provided with a stiffening member 74, as best seen in Figs. 1 and 4, in the form of a flat upstanding strip of material welded along one edge to the upper surface of the skirt 46 and extending between adjacent pairs of ears 60.

In the illustrated construction, the screen assembly is vibrated upon the resilient support provided by the springs 36 by a conventional vibrating unit 76 of the unbalanced weight type which includes a pair of unbalanced flywheels 78 mounted for rotation with a shaft 80. The shaft 80 is rotatably supported within bearing assemblies 82, one bearing assembly being located at either side of the screen box 10. The shaft 90 extends through the interior of the screen box within a fixed tubular shield 84 which is sealed to the opposed side walls 38 of the screen box 10 to protect the rotating shaft 80 from the material being screened in the box. The shaft 80 is driven in rotation by means of a pulley 86 which in turn is driven by means of a belt or belts 88 from a drive shaft 90 and a drive pulley 92 driven by any suitable means.

Rotation of the shaft 90 drives the shaft 80 together with the associated flywheels 78. Each of the flywheels 78 is provided with an unbalanced counterweight, so that rotation of the shaft 80 imparts a vibratory motion to the screen box 10.

Operation of the screen assembly illustrated is similar to more conventional screens insofar as the separatory process is concerned. Material to be separated may be fed into the feed spout 22 and the cut-out 20 onto the upper surface of the screen. Vibratory movement of the screen box 10 under the influence of the rotating counterweights conveys the material toward the discharge end of the screen cloth 50, the liquid or finer elements of the incoming material passing through the openings of the screen cloth while the coarser elements remain on top of the screen cloth and are eventually discharged over the lip 28. Material passing through the screen cloth falls onto the bottom plate 12 and is discharged through the spout 26. While the screen assembly is shown as being supported with the screen cloth 50 extending in its generally horizontal direction, such screen assemblies are sometimes mounted in an uphill position when difficult separations are encountered and/or particularly dry, over-sized products are desired. The over-sized material is conveyed uphill by the vibratory action.

In other instances where easy separation and/or higher over-sized capacities are encountered the screen assemblies are mounted in a downhill position (the feed end located at an elevation above the discharge end) in order that gravity may assist the vibratory action of the assembly in conveying the coarser material to the discharge end of the screen.

In the device illustrated it will also be noted that the outer cover 54 may be easily removed after unfastening the nuts 56 from the edges of the outer cover and removing the nut 68, spring 70 and washer 72 from each of the arms 66 of the tie members 63. The outer cover may then be lifted from the screen box 10 with the aid of the handle 58, bringing with it the screen supporting and covering member 42 and the screen cloth 50. The screen cloth 50 is then readily unhooked from the skirt flanges 48 and virtually all of the material contacting surfaces, including the interior of the screen box 10, will be made accessible for cleaning or other purposes.

While the present invention has been described in detail with respect to one embodiment thereof, it will be apparent to those skilled in the art that this embodiment is capable of various modifications and alternative constructions without departing from the spirit and scope of the invention. The foregoing description is therefore to be considered as exemplary rather than limiting, and the true scope of the invention is to be taken as that defined in the following claims.

Having thus described the invention, I claim:

1. In a vibrating screen the improvement comprising a pair of laterally spaced longitudinally extending side walls, a cover substantially closing the space between the tops of said side walls, a pair of longitudinally extending skirts depending from the underside of said cover with each of said skirts having a free longitudinal edge spaced laterally from a respective one of said side walls, a screen cloth positioned between and attached to the free longitudinal edges of said skirts, and means connected to each of said skirts for urging the same towards its respective side wall to spread apart said free longitudinal edges and to tension the screen cloth positioned therebetween.

2. The improvement as defined in claim 1 further characterized by said urging means for each skirt comprising at least one tie member connected at one end thereof to said skirt and extending generally laterally outwardly therefrom through the associated side wall, and means for applying an outwardly directed tension force to the other end of said tie member tending to pull said skirt toward said associated side wall.

3. The improvement as defined in claim 2 further characterized by said tension force applying means comprising a nut threaded onto the other end of said tie member for axial advancement along the length thereof, and a compression spring placed over said tie member between said side wall and said nut, axial advancement of said nut toward the side wall compressing said spring and creating a tension force in said tie member for pulling said skirt toward said side wall.

4. The improvement as defined in claim 1 further characterized by said urging means for each skirt comprising a plurality of laterally outwardly protruding lug means rigidly secured to said skirt along the length thereof, a tie member pivotally connected to each of said lug means for movement about a horizontal axis and extending laterally outwardly through the associated side wall, a nut threaded onto the other end of said tie member for axial advancement along the length thereof, and a compression spring placed over said tie member between said side wall and said nut, axial advancement of said nut toward the side wall compressing said spring and creating a tension force in said tie member for pulling said skirt toward said side wall.

5. The improvement as defined in claim 4 further characterized by a reinforcing rib secured to said skirt between adjacent lug means for distributing the tension forces applied to the lug means along the length of the skirts.

6. In a vibrating screen the improvement comprising a screen box having an upper portion defining longitudinally extending laterally spaced side walls, a screen cloth supporting and covering member including a relatively wide longitudinally extending central portion and depending skirts inclined laterally outwardly from the lateral edges of said central portion, each of said skirts terminating in a longitudinally extending flange laterally spaced from the other flange by a distance less than the distance between said side walls, a screen cloth disposed between and connected to said flanges, means for vertically supporting said screen cloth supporting and covering member between said side walls with the flanges thereof in laterally spaced relationship with the corresponding side walls, and means connected to each of said skirts for urging the same laterally outwardly to spread apart said flanges and tension said screen cloth therebetween.

7. The improvement defined in claim 6 further characterized by said means for vertically supporting said screen cloth supporting and covering member comprising an outer cover extending across and fastened to the top portions of said side walls, and means for fastening said screen cloth supporting and covering member to the bottom surface of said outer cover.

8. The improvement as defined in claim 6 further characterized by said means for urging each of said skirts laterally outwardly comprising a plurality of laterally outwardly protruding lug means secured to said skirt along the length thereof, a tie member pivotally connected to each of said lug means for movement about a horizontal axis and extending laterally outwardly through the associated side wall, a nut threaded onto the other end of said tie member for axial advancement along the length thereof, a compression spring placed over said tie member between said side wall and said nut, and a reinforcing rib secured to said skirt between adjacent lug means for distributing the tension forces applied to said lug means along the length of said skirts.

No references cited.